(12) United States Patent
Strachan et al.

(10) Patent No.: US 8,438,742 B2
(45) Date of Patent: May 14, 2013

(54) PHYSICAL TEMPLATE FOR DEPLOYING AN EARTH-BASED SENSOR NETWORK

(75) Inventors: John Paul Strachan, Millbrae, CA (US); Wei Wu, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 318 days.

(21) Appl. No.: 13/017,873

(22) Filed: Jan. 31, 2011

(65) Prior Publication Data

US 2012/0192441 A1    Aug. 2, 2012

(51) Int. Cl.
    *G01C 15/00*      (2006.01)
    *G01B 3/14*      (2006.01)

(52) U.S. Cl.
    USPC .................................. 33/1 H; 33/563

(58) Field of Classification Search ............... 33/1 H, 33/563
See application file for complete search history.

(56) References Cited

U.S. PATENT DOCUMENTS

| | | | | |
|---|---|---|---|---|
| 6,591,512 | B2 * | 7/2003 | Ziegler | 33/562 |
| 2008/0040942 | A1 * | 2/2008 | Eales et al. | 33/707 |
| 2011/0219634 | A1 * | 9/2011 | Sammut | 33/506 |
| 2011/0289787 | A1 * | 12/2011 | Yi et al. | 33/286 |

* cited by examiner

*Primary Examiner* — G. Bradley Bennett

(57) ABSTRACT

A physical template for deploying an earth-based sensor network. The physical template includes a physical mesh. The physical mesh is configurable as a surface-covering structure that includes a plurality of nodes. A node of the plurality of nodes is to position a sensor for deployment of the sensor within a specified distance of a location on a surface of the Earth. A sensor-network-deployment system including the physical template for deploying an earth-based sensor network, and a method for deploying an earth-based sensor network utilizing the physical template are also provided.

19 Claims, 7 Drawing Sheets

PHYSICAL TEMPLATE FOR DEPLOYING AN EARTH-BASED SENSOR NETWORK

CROSS-REFERENCE TO RELATED APPLICATIONS

This application is related to commonly assigned patent applications: U.S. patent application Ser. No. 12/790,970, filed May 31, 2010, entitled, "Node Placement Apparatus, System and Method;" International Application No. PCT/US10/33,236, filed Apr. 30, 2010, entitled, "Aerostatic Platform for Monitoring an Earth-Based Sensor Network;" U.S. patent application Ser. No. 12/770,941, filed Apr. 30, 2010, entitled, "Sensor-Location System for Locating a Sensor in a Tract Covered by an Earth-Based Sensor Network:" and, U.S. patent application Ser. No. 12/830,183, filed Jul. 2, 2010, entitled, "Installation Platform for Deploying an Earth-Based Sensor Network Utilizing a Projected Pattern from a Height."

TECHNICAL FIELD

Examples of the present technology relate generally to earth-based sensor networks, a sensor-network-deployment system for deploying an earth-based sensor network, and a method for deploying the earth-based sensor-network.

BACKGROUND

As the demand for resources increases with the growth of human populations, interest in developing new methodologies for the discovery and exploitation of these resources continues to grow. For example, with the emergence of increasing demand for petroleum products from rapidly developing countries, the impetus to find new reserves of oil has taken a pre-eminent role in the global economy. Moreover, increasing global populations have placed greater demands on securing the borders of countries in proximity to large populations displaced by economic stressors affecting their less fortunate neighbors. In addition, the growth of human populations along with increasing polarizations within such populations has raised the specter of terrorist assaults affecting domestic tranquility within sovereign territories. All the above, suggest applications that may profit from methodologies for monitoring large tracts of land with sensor networks.

Thus, scientists are engaged in developing new methodologies for the deployment of diverse sensor networks on the surface of the Earth, whether those sensors, for example, are directed towards the discovery of new mineral resources, or towards the defense of countries from emerging threats to their security.

DESCRIPTION OF THE DRAWINGS

The accompanying drawings, which are incorporated in and form a part of this specification, illustrate examples of the technology and, together with the description, serve to explain the examples of the technology.

Figure 1A:
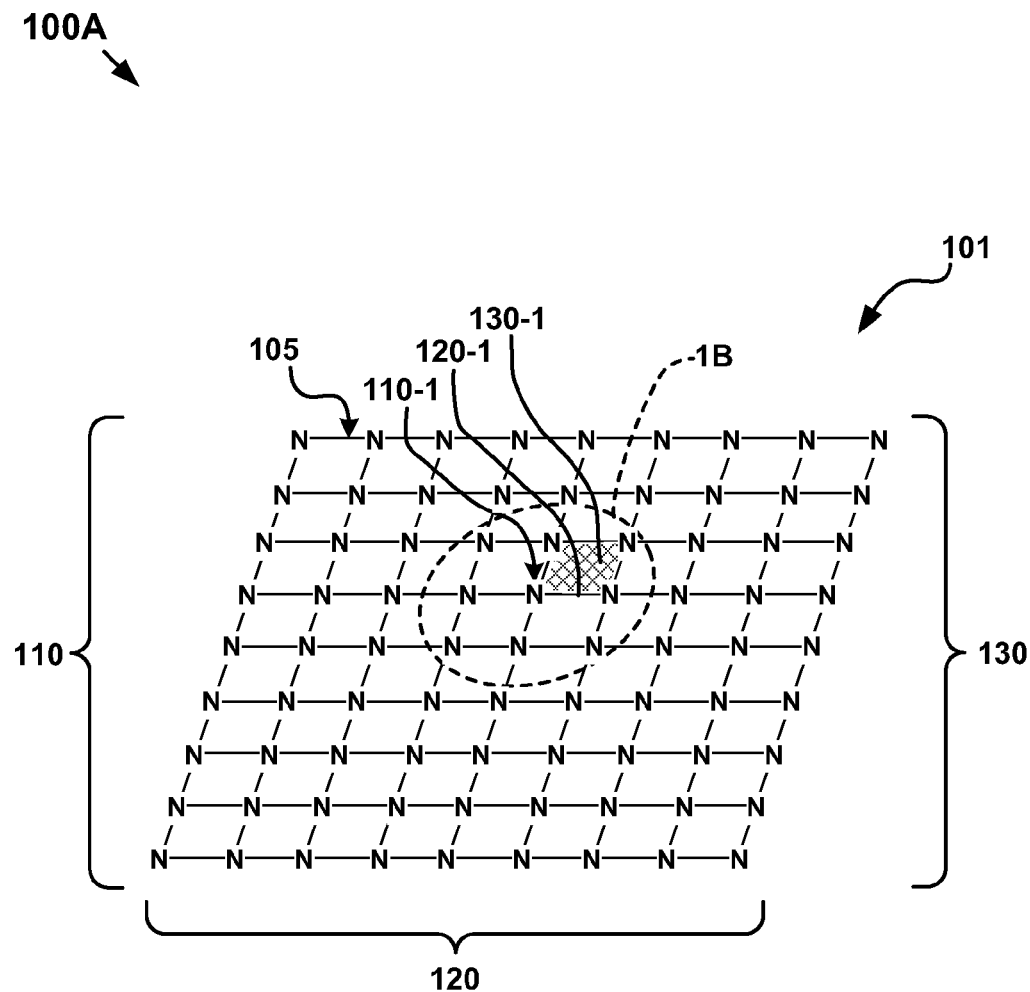
FIG. 1A is a perspective view of a physical template for deploying an earth-based sensor network, in accordance with examples of the present technology.

The drawings referred to in this description should not be understood as being drawn to scale except if specifically noted.

DESCRIPTION OF EXAMPLES

Reference will now be made in detail to the alternative examples of the present technology. While the technology will be described in conjunction with the alternative examples, it will be understood that they are not intended to limit the technology to these examples. On the contrary, the technology is intended to cover alternatives, modifications and equivalents, which may be included within the spirit and scope of the technology as defined by the appended claims.

Furthermore, in the following description of examples of the present technology, numerous specific details are set forth in order to provide a thorough understanding of the present technology. However, it should be noted that examples of the present technology may be practiced without these specific details. In other instances, well known methods, procedures, and components have not been described in detail as not to unnecessarily obscure examples of the present technology. Throughout the drawings, like components are denoted by like reference numerals, and repetitive descriptions are omitted for clarity of explanation if not necessary.

Examples of the present technology include a physical template for deploying an earth-based sensor network. The physical template includes a physical mesh. The physical mesh is configurable as a surface-covering structure that includes a plurality of nodes. A node of the plurality of nodes is to position a sensor for deployment of the sensor within a specified distance of a location on a surface of the Earth. Examples of the present technology also include a sensor-network-deployment system including the physical template for deploying an earth-based sensor network, and a method for deploying an earth-based sensor network utilizing the physical template are also provided. Examples of the present technology are suitable for rapid deployment of an earth-based sensor network with high accuracy.

Figure 3:
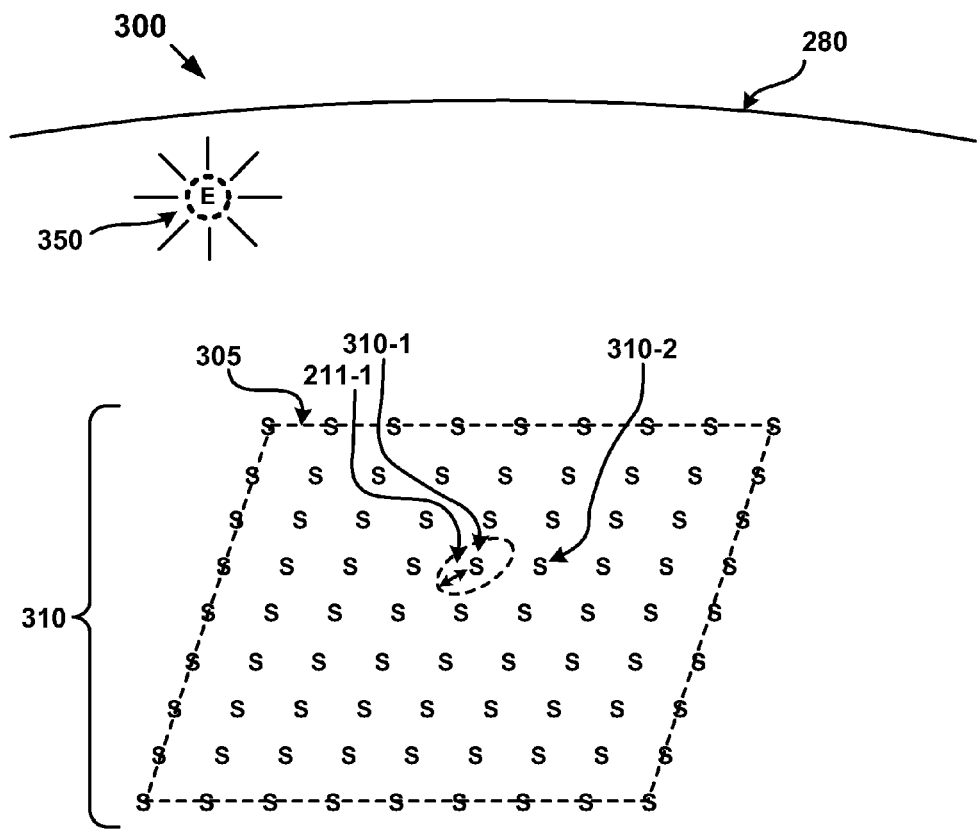
FIG. 3 is a perspective view of the earth-based sensor network detailing the arrangement of sensors in the earth-based sensor network in proximity to the locations for sensors of FIG. 2, in accordance with examples of the present technology.

With reference now to FIG. 1A, in accordance with examples of he present technology, a perspective view 100A is shown of a physical template 101 for deploying an earth-based sensor network 305 (see FIG. 3). The physical template 101 includes a physical mesh 105. The physical mesh 105 includes a plurality 110 of nodes, indicated by letters, "N," herein, of which node 110-1 is an example, and a plurality 130 of inter-nodal regions, of which inter-nodal region 130-1

Figure 2:
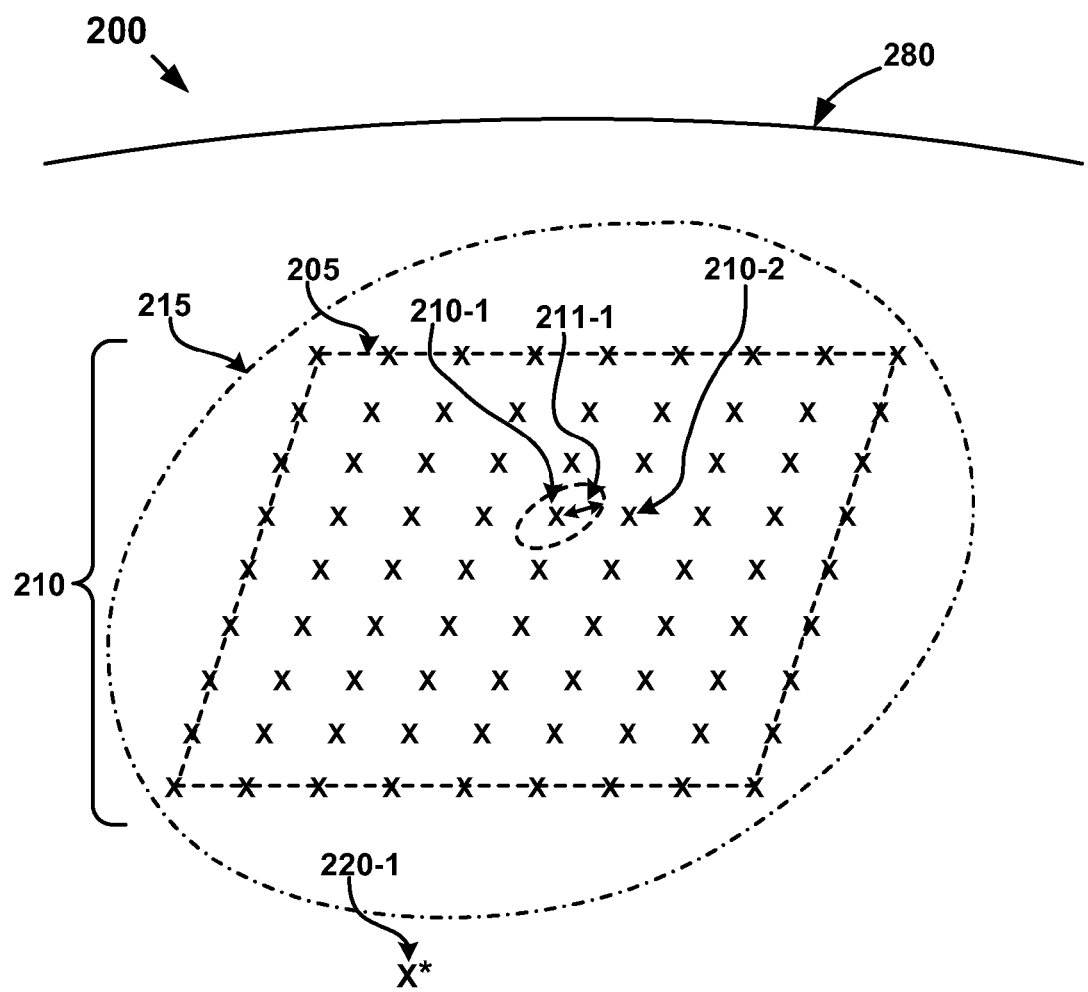
FIG. 2 is a perspective view of locations for sensors in the earth-based sensor network on a surface of the Earth, in accordance with examples of the present technology.

(shown in cross-hatching in FIG. 1A) is an example. The physical mesh 105 is configurable as a surface-covering structure that includes the plurality 110 of nodes. By way of example, the plurality 110 of nodes may be disposed in a structure having a shape selected from the group consisting of a rectangular grid, a triangular latticework, and an oblique latticework, without limitation thereto. Referring also to FIGS. 2 and 3, a node 110-1 of the plurality of nodes is to position a sensor 310-1 for deployment of the sensor 310-1 within a specified distance 211-1 of a location 210-1 on a surface of the Earth 280. Thus, in accordance with examples of the present technology, the physical template 101 for deploying an earth-based sensor network 305 may also include a plurality of sensor attachment portions.

With further reference to FIGS. 1A, 2 and 3, by way of examples of the present technology, the sensor attachment portion of the plurality of sensor attachment portions is to position the sensor 310-1 for deployment of the sensor 310-1 within a specified distance 211-1 of the location 210-1 on the surface of the Earth 280. Alternatively, the physical mesh 105 may include a sheet of material, without limitation thereto. The sheet of material may include a flexible fabric, which may be referred to herein by the term of art, "blanket." Thus, referring once again to FIGS. 2 and 3, the physical mesh 105 is also configurable as a surface-covering structure, for example, a blanket, without limitation thereto, to position the sensor 310-1 in proximity to the location 210-1 for the sensor 310-1 in the earth-based sensor network 305. Thus, the sensor attachment portion may include a pocket in the blanket to accept the sensor 310-1, without limitation thereto. Alternatively, the physical mesh 105 may include a plurality 120 of tie-bars, of which tie-bar 120-1 is an example, which are next described in greater detail. The circle 1B shown in FIG. 1A delineates a portion of the physical mesh 105 of the physical template 101 that is next described.

Figure 1B:
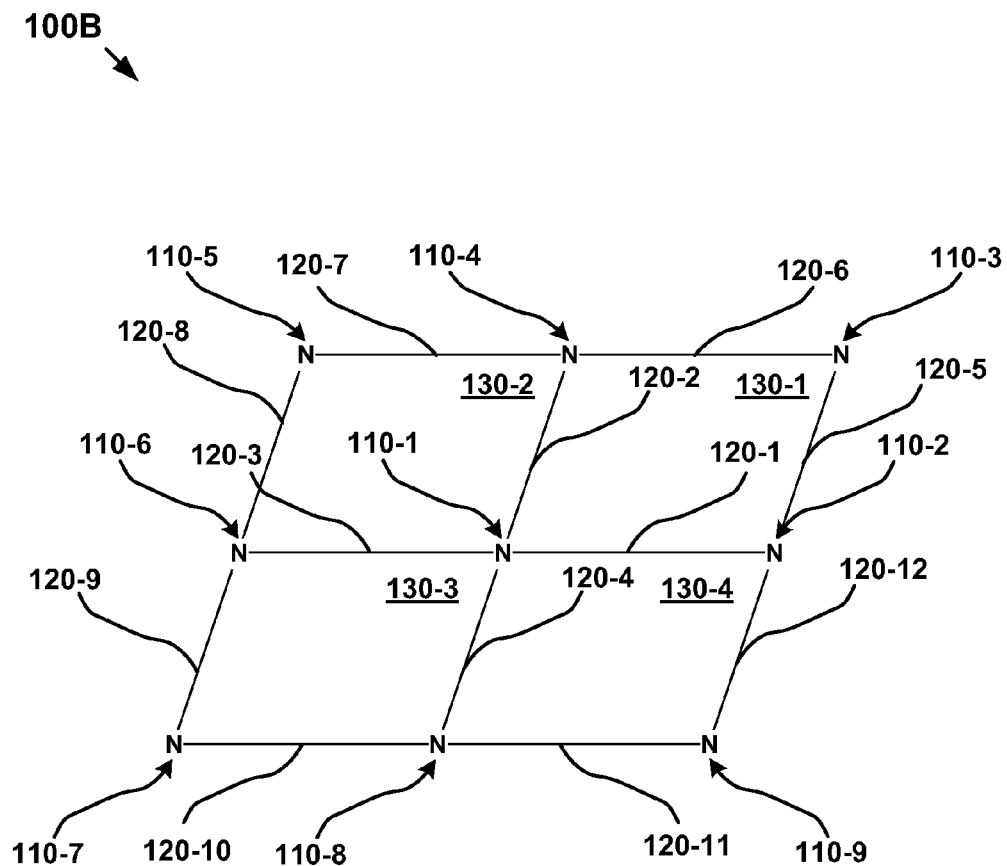
FIG. 1B is a perspective view of the physical template of FIG. 1A detailing a portion of the physical template within circle 1B of FIG. 1A, in accordance with examples of the present technology.

With reference now to FIG. 1B, in accordance with examples of the present technology, a perspective view 100B is shown of the physical template 101 of FIG. 1A. FIG. 1B details the portion of the physical template 101 within circle 1B of FIG. 1A. As shown in FIG. 1B, the plurality 120 of tie-bars includes tie-bars 120-1 through 120-12. The tie-bars may also be disposed in a structure having a shape selected from the group consisting of a rectangular grid, a triangular latticework, and an oblique latticework, without limitation thereto. The tie-bars are coupled to the plurality of nodes in the physical mesh 105. For example, tie-bars 120-1 through 120-12 are coupled to nodes 110-1 through 110-9 and surround internodal regions 130-1 through 130-4. Thus, by way of example, tie-bars 120-1 through 120-12 are disposed in a rectangular grid, although appearing oblique due to the perspective view 1003. In accordance with examples of the present technology, the physical mesh 105 may include a plurality 120 of tie-bars in a framework of rigid members. A rigid member of the framework of rigid members may be a rigid rod. The framework may include an adjustable framework of rigid members such that the rigid members are coupled within the framework with rotatable couplings.

Alternatively, with further reference to FIG. 1B, in accordance other examples of the present technology, the plurality 120 of tie-bars may include a flexible framework of compliant members. A compliant member of the flexible framework of compliant members may be an inflatable envelope of material. The inflatable envelope of material may be an inflatable tube that becomes stiffer with increasing inflation of the tube. The degree of inflation may be adjusted to control the spacing between nodes in the physical mesh, as well as to allow the physical mesh to conform to the shape of the surface of the Earth 280, for example, over rough terrain of a region of interest 215 (see FIG. 2). Thus, in accordance other examples of the present technology, the compliant member of the flexible framework of compliant members may also include a compliant member selected from the group consisting of a rope, a cable, a chain, a cord, a wire, and a metallic strip of shape-memory alloy. If a compliant member of the flexible framework of compliant members includes a rope, a cable, a chain, a cord, or a wire, the compliant member may be stretched taut to dispose the plurality 110 of nodes of the physical mesh 105 in rigidly fixed locations on the surface of the Earth 280 (see FIGS. 2 and 3). If a compliant member of the flexible framework of compliant members includes a metallic strip of shape-memory alloy, the temperature at which the physical mesh 105 is deployed may be controlled so that the physical mesh 105 is initially compliant at an elevated temperature, but upon cooling becomes rigid as strips of the shape-memory alloy assume a rigid shape upon cooling. For example, with reference also to FIGS. 1A and 2, node 110-1 may be disposed at location 210-1 by such operations, which is subsequently described in greater detail.

Figure 1C:
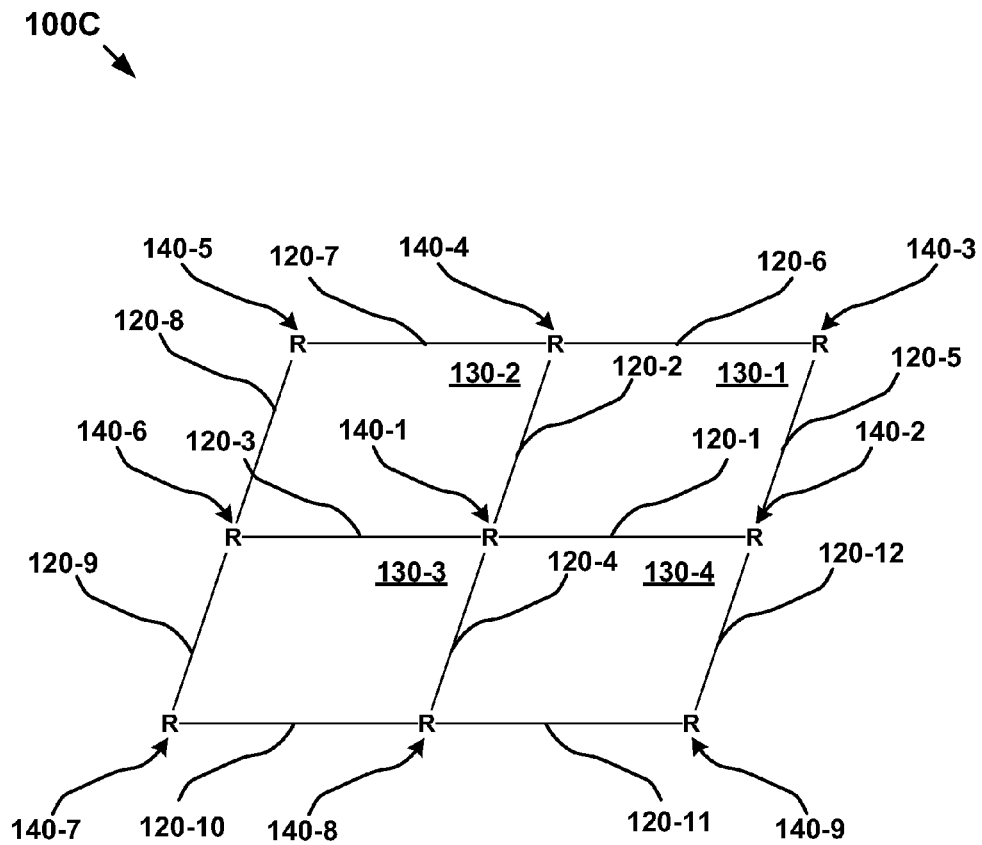
FIG. 1C is a perspective view of the portion of the physical template shown in FIG. 1B detailing the disposition of sensor receptacles at the location of nodes in the physical template of FIG. 1A, in accordance with examples of the present technology.

With reference now to FIG. 1C and further reference to FIGS. 1A and 1B, in accordance with examples of the present technology, a perspective view 1000 is shown of the portion of the physical template 101 shown in FIG. 1B. FIG. 1C details the disposition of sensor receptacles at the location of nodes in the physical template 101 of FIG. 1A. As shown in FIG. 1C, the physical template 101 further includes a plurality of sensor receptacles disposed at the plurality 110 of nodes. For example, the physical template 101 includes a sensor receptacle 140-1 disposed at the node 110-1. Referring once again to FIGS. 2 and 3, the sensor receptacle 140-1 is to hold the sensor 310-1 for deployment of the sensor 310-1 within the specified distance 211-1 of the location 210-1 on the surface of the Earth 280. In addition, the physical mesh 105 includes a plurality 120 of tie-bars, for example, tie-bars 120-1 through 120-12. For example, at least two tie-bars 120-1 and 120-2 are attached to the sensor receptacle 140-1. Referring also to FIGS. 2 and 3, the tie-bars 120-1 and 120-2 are configurable to position the sensor receptacle 140-1 in proximity to the location 210-1 for the sensor 310-1 in the earth-based sensor network 305. Alternatively, in accordance with other examples of the present technology, the physical mesh 105 may include a plurality of sensor positioners, which may be tie-bars, but may also be other than tie-bars. For example, the sensor positioners may be portions of the blanket, previously described. At least two sensor positioners may be attached to the sensor receptacle 140-1, which may be a pocket in the blanket. Similarly, referring to FIGS. 2 and 3, the sensor positioners are configurable to position the sensor receptacle 140-1 in proximity to the location 210-1 for the sensor 310-1 in the earth-based sensor network 305.

With further reference to FIG. 1C, in accordance other examples of the present technology, the physical mesh 105 of the physical template 101 has a plurality 130 of inter-nodal regions, for example, inter-nodal regions 130-1, 130-2, 130-3 and 130-4, disposed between the plurality 110 of nodes. A sensor-network appliance (not shown) may be disposed within an inter-nodal region, for example, inter-nodal region 130-1, of the plurality 130 of inter-nodal regions. By way of example, the sensor-network appliance may be a solar-cell panel, without limitation thereto. The solar-cell panel may supply electrical power to at least one sensor. For example, a solar-cell panel disposed at inter-nodal region 130-1 may supply electrical power to a sensor 310-1 disposed in sensor receptacle 140-1.

With reference now to FIGS. 2 and 3, in accordance with examples of the present technology, a perspective view 200 is shown in FIG. 2 relevant to the description of the geometrical arrangement of various components in examples of the present technology, described herein; and, in FIG. 3, a perspective view 300 is shown of the earth-based sensor network 305. FIG. 2 shows the surface of the Earth 280, as delineated by the horizon, and locations for deployment with respect to the surface of the Earth 280 of a plurality 310 of sensors, of which sensors 310-1 and 310-2 are examples, in the earth-based sensor network 305 shown in FIG. 3. As shown in FIG. 2, in accordance with an example of the present technology, a sensor-deployment pattern 205 is shown; and, the plurality 210 of locations for sensors is indicated by a sensor-location marker, "X," at each location for a sensor, for example, locations 210-1 and 210-2 for sensors 310-1 and 310-2, with respect to the surface of the Earth 280. By way of example, the array of sensors of the sensor-deployment pattern 205 for the plurality 210 of locations appears to be arranged in a grid pattern, without limitation thereto; but, other geometrical arrangements for the deployment of sensors within the earth-based sensor network 305 are within the spirit and scope of examples of the present technology. For example, even though the array of sensors of the sensor-deployment pattern 205 for the plurality 210 of locations appears to be arranged in a regular geometrical pattern, for example, the grid pattern shown in FIG. 2, a plurality of sensors may be arranged in a less regular array. For example, the plurality 210 of locations may be displaced above and below a plane of a regular grid pattern. In such a case, once the location of one sensor, a supervisory sensor, for example., sensor 310-2, is determined by GPS or differential GPS (DEPS), the locations of other sensors may be determined relative to the supervisory sensor by combining topographical maps, as might be obtained through light detection and ranging (LIDAR), with knowledge of the pre-determined location of the nodes in the physical template 101. Thus, in accordance with examples of the present technology, the array of sensors of the sensor-deployment pattern 205 for the plurality 210 of locations may be less regular, as is likely to be the case for deployments in rough terrain, which makes examples of the present technology that provide for deploying the sensors with accuracy quite useful. Examples of the present technology are directed towards a rapid means for deployment of sensors in the earth-based sensor network, such as, for example, earth-based sensor network 305 based on the sensor-deployment pattern 205 for the plurality 210 of locations. Examples of the present technology also provide an alternative to other techniques of sensor deployment known in the art, such as, the use of trucks with drag lines having attached sensors. Examples of the present technology also refer to an "earth-based" sensor network 305, because sensors may be deployed on various types of tracts on the surface of the Earth, without limitation to terrestrial terrains.

With further reference to FIG. 2, in accordance with examples of the present technology, for sensors arrayed in a square-grid pattern, similar to the sensor-deployment pattern 205 for the plurality 210 of locations for sensors shown in FIG. 2, the dimensions of the earth-based sensor network 305 can be as large as about 10 kilometers (km) on each side, with about one million, $1 \times 10^6$, sensors arranged in a square-grid pattern. For such large patterns, in accordance with examples of the present technology, multiple sensor templates may be deployed that are "stitched" together to form a large earth-based sensor network where the sensors may be spaced about every 10 meters (m) from the next adjacent sensor in two orthogonal directions. As used herein, "stitching" is a term of art that refers to combining two or more physical templates into a single larger physical template with well-defined locations for the deployment of sensors in an earth-based sensor network larger than the earth-based sensor networks associated with individual physical templates. Thus, in another example of the present technology, a location 220-1 for deployment of another sensor of an adjacent physical template with respect to the surface of the Earth 280 is indicated by the sensor-location marker, "X*," in FIG. 2.

With further reference to FIGS. 1A-2, in accordance with examples of the present technology, the supervisory sensor, for example, sensor 310-2, further includes at least one electronic accessory unit selected from the group consisting of: a receiver for receiving signals sent to the supervisory sensor; a global-positioning system (GPS) receiver, for example, configured to determine a position of the supervisory sensor; and, a differential GPS (DGPS) receiver, for example, configured to determine a position of the supervisory sensor, without limitation thereto. Thus, the location 210-2 for the supervisory sensor, for example, sensor 310-2, may be determined from GPS or DGPS, and a location 210-1 for another sensor, for example, sensor 310-1, may be determined from the relative location of the other sensor in the physical template 101 with respect to the location 210-2 for the supervisory sensor in the earth-based sensor network 305. Thus, knowledge of the pre-determined location of the plurality 110 of nodes in the physical template 101 determines the relative location of a sensor with respect to the supervisory sensor for deployment of the sensor 310-1 within the specified distance 211-1 of the location 210-1 for the sensor 310-1 on the surface of the Earth 280. The accuracy with which a sensor, for example, sensor 310-1, may be deployed within a specified distance 211-1 of a location on a surface of the Earth 280 is, thus, affected by the accuracy with which sensor positioners, for example, tie-bars 120-1, 120-2, 120-3 and 120-4, may be manufactured and assembled to form the physical mesh 105 of the physical template 101. For example, the inventors believe that for a deployment of the physical template 101 on level terrains millimeter-level accuracy might be provided in positioning sensors in the earth-based sensor network 305 through precision machining of the plurality 120 of rigid tie-bars used in the assembly of the physical mesh 105 of the physical template 101.

With further reference now to FIGS. 2 and 3, in accordance with examples of the present technology, a GPS receiver, or DGPS receiver, may be configured to determine the location 210-2 for a supervisory sensor, for example, sensor 310-2. In accordance with one example of the present technology, if the electronic accessory unit includes a GPS or DGPS receiver, the GPS or DGPS receiver may be configured to provide co-ordinates of the location 210-2 for the supervisory sensor, for example, sensor 310-2, on the surface of the Earth 280. Alternatively, in accordance with examples of the present technology, the location 210-1 of the sensor 310-1 in the earth-based sensor network 305 may also be provided relative to the location of other sensors in the earth-based sensor network 305 without absolute co-ordinates relative to the Earth 280. For example, in one example of the present technology, such co-ordinates of location 210-1 of the sensor 310-1 in the earth-based sensor network 305 may be given in relative co-ordinates of other sensors in the earth-based sensor network 305. Thus, in one example of the present technology, if the absolute co-ordinates relative to the Earth 280 of one sensor in the earth-based sensor network 305 is determined, the absolute co-ordinates of all the other sensors in the earth-based sensor network 305 may be computed based on the relative co-ordinates of the other sensors in the earth-based sensor network 305 with respect to one or more sensors in the earth-based sensor network 305 for which the absolute co-ordinates relative to the Earth 280 are known.

Figure 4:
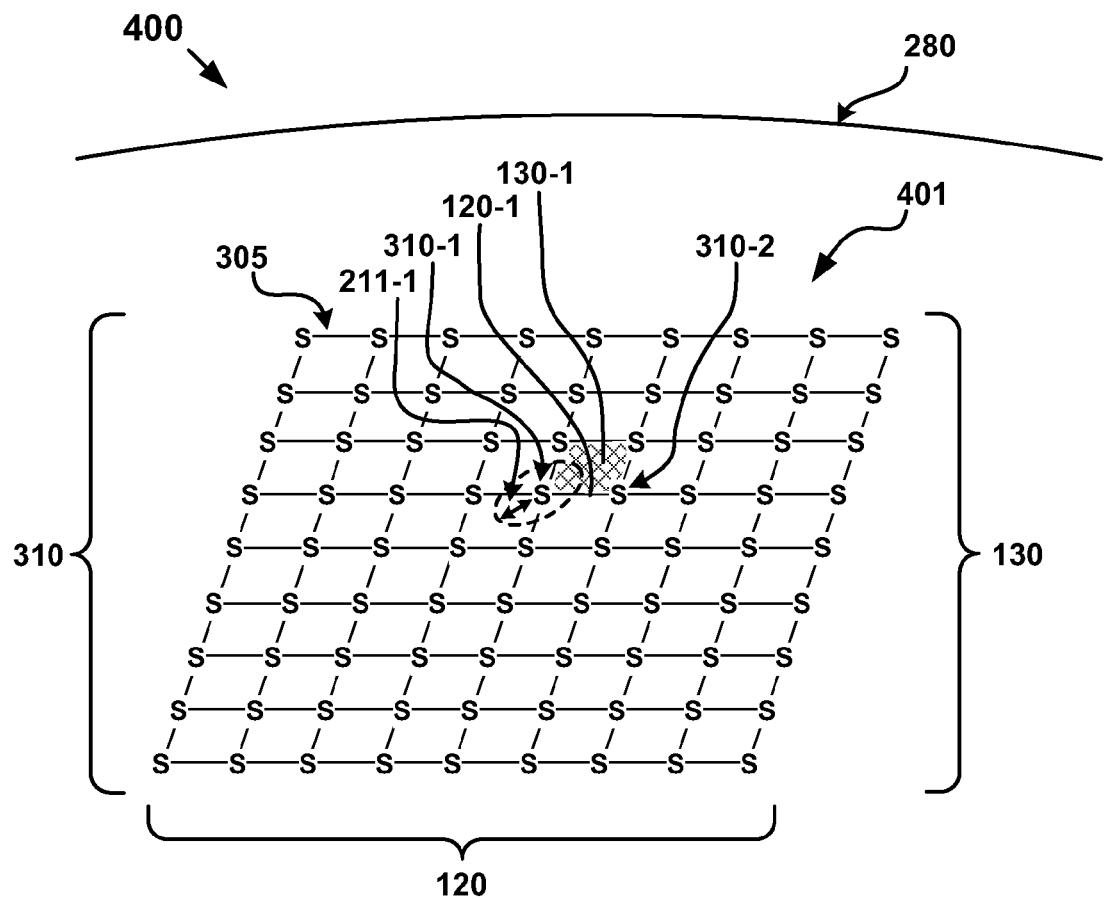
FIG. 4 is a perspective view of a sensor-network-deployment system including the physical template of FIG. 1A populated with sensors and deployed on the surface of the Earth at the sensor of FIG. 2 in the earth-based sensor network 305 of FIG. 3, in accordance with examples of the present technology.

With reference now to FIG. 3 and further reference to FIGS, 1A-2, in accordance with yet other examples of the present technology, a perspective view 300 is shown of the earth-based sensor network 305. FIG. 3 details the arrangement of sensors in the earth-based sensor network 305 in the sensor-deployment pattern 205 of the plurality 210 of locations for sensors of FIG. 2. As shown in FIG. 4, by way of example, the earth-based sensor network 305 includes a plurality 310 of sensors, each sensor of which is indicated by the letter "S", which is located at the plurality 210 of locations, indicated by the sensor-location marker, "X," in FIG. 2, without limitation thereto. The earth-based sensor network 305 may include the plurality 310 of sensors, of which sensors 310-1 and 310-2 are examples, deployed on the surface of the Earth 280. The plurality 310 of sensors, of which sensor 310-1 is an example, may transmit signals. In one example of the present technology, the earth-based sensor network 305 provides a central nervous system for the Earth (CeNSE) that can provide a variety of data from the surface of the Earth 280. In an example of the present technology, the earth-based sensor network 305 is configured to provide information about the effects of an event 350 on sensors in the plurality 310 of sensors, of which sensor 310-1 is an example, through transmission of a signal associated with the event 350. For example, through the effects of the event 350 on at least one sensor 310-1 in the earth-based sensor network 305, the signal may provide data about: the event 350, itself; and/or, the effects of the event 350 on the Earth. Consequently, in accordance with examples of the present technology, the sensor 310-1 may be selected from the group consisting of an accelerometer, a geophone, a seismometer, a vibration sensor, a chemical sensor, a toxin sensor, a pollutant sensor, an explosive sensor, and a safety sensor.

By way of example., with further reference to FIGS. 1A-3, the event 350 may be the artificially produced vibration of a seismic vibrator used to induce vibrations in the Earth for reflection seismography, as is used in petroleum exploration. On the other hand, in another example of the present technology, the event 350 might be of natural origin, such as, an earthquake. Thus, in accordance with examples of the present technology, the signal transmitted from the sensor 310-1 includes geophysical data, which may be derived from an accelerometer, a geophone, or alternatively, a seismometer, or other geophysical sensor. By way of further example, in accordance with another example of the present technology, the event 350 may be the onset of structural failure of a structure, for example, a bridge. Thus, in accordance with examples of the present technology, the signal transmitted from the sensor 310-1 may include safety data, which may be derived from an accelerometer, and/or a safety sensor. For example, more generally, a safety sensor may also include a chemical sensor without limitation thereto; the chemical sensor may be selected from the group consisting of a sensor sensitive to toxins, a sensor sensitive to pollutants, and a sensor sensitive to explosives, without limitation thereto.

With reference now to FIG. 4 and further reference to FIGS. 1A-3, in accordance with yet other examples of the present technology, a perspective view 400 is shown of a sensor-network-deployment system 401 including the physical template 101 of FIG. 1A. FIG. 4 shows the physical template 101 populated with sensors, and deployed on the surface of the Earth 280 in proximity to the locations for sensors of FIG. 2 in the earth-based sensor network 305 of FIG. 3. The sensor-network-deployment system 401 includes the physical template 101. Thus, in accordance with examples of the present technology, previously described examples of the present technology for the physical template 101 may be incorporated within the environment of the sensor-network-deployment system 401. The physical template 101 includes a physical mesh 105. The physical mesh 105 is configurable as a surface-covering structure that includes a plurality 110 of nodes 110-1. A node 110-1 of the plurality of nodes is to position a sensor 310-1 for deployment of the sensor 310-1 within a specified distance 211-1 of a location 210-1 on a surface of the Earth 280. As shown in FIG. 4, the physical template 101 may further include the plurality 310 of sensors, of which sensor 310-1 is an example. Thus also, in accordance with examples of the present technology, previously described examples of the present technology for the earth-based sensor network 305 including the plurality 310 of sensors may be incorporated within the environment of the sensor-network-deployment system 401. The sensor 310-1 of the plurality 310 of sensors may be disposed at a node 110-1 of the plurality 110 of nodes. The sensor 310-1 of the plurality 310 of sensors may be disposed in the sensor receptacle 140-1 shown in FIG. 1C. Thus, in accordance with yet other examples of the present technology, the sensor 310-1 may be deployed within a specified distance 211-1 of a location 210-1 on a surface of the Earth 280. The specified distance 211-1 may be less than about 10 centimeters.

With further reference to FIGS. 1A-4, in accordance with examples of the present technology, the sensor-network-deployment system 401 may also include at least one supervisory sensor, for example, sensor 310-2. The supervisory sensor may further include a sensor locator to determine the position of the supervisory sensor on the surface of the Earth 280. Moreover, in accordance with examples of the present technology, the positions of other sensors 310-1 in the physical template 101 are fixed relative to the position of the at least one supervisory sensor, for example, sensor 310-2. The locations for other sensors, of which sensor 310-1 is an example, on the surface of the Earth 280 may be determined from a location 210-2 for the supervisory sensor, for example, sensor 310-2, on the surface of the Earth 280. The location 210-2 for the supervisory sensor on the surface of the Earth 280 may be determined by GPS or DGPS, as previously described.

With further reference to FIGS. 1A-4, in accordance with examples of the present technology, the sensor-network-deployment system 401 may further include at least one sensor-support device, for example, a peripheral component, configured to provide a support function for at least one sensor, and a sensor-system package encapsulating the sensor and at least one sensor-support device. The sensor-support device may be selected from the group consisting of a power supply, a signal receiver, a signal transmitter, and a data-storage unit, without limitation thereto. In accordance with examples of the present technology, the signal receiver, the signal transmitter, and the data-storage unit may provide for reception, transmission, and storage of data or information communicated to, or by, the earth-based sensor network 305. In one example of the present technology, the sensor-support device including the power supply may include a solar-cell panel, for example, a sensor-network appliance disposed within an internodal region, such as internodal region 130-1, that provides a power source for the sensor and any attached sensor-support devices, such as a signal receiver, a signal transmitter, and a data-storage unit, without limitation thereto. Moreover, the sensor-network-deployment system 401 may further include data conduits, fiber-optic channels, or wires disposed in portions of the physical template 101. By way of example, without limitation thereto, wires for data transmission to and from the sensors may be disposed in the inflatable tubes, previously described.

With further reference to FIGS. 1A-4, in accordance with other examples of the present technology, the sensor-network-deployment system 401 may further include a vehicle. The vehicle may be loaded with the physical template 101 having the plurality 310 of sensors. The vehicle is to deploy the physical template 101 having the plurality 310 of sensors within a region of interest 215 on the surface of the Earth 280. The physical template 101 may be disposed in a compact package while the physical template 101 remains on the vehicle and reconfigures itself when the physical template 101 is unloaded from the vehicle upon being deployed at the region of interest 215. In accordance with examples of the present technology, the vehicle may also be a machine that automatically deploys the physical template 101, such as, a truck, an airplane, a helicopter, or other transportation vehicle. For example, an aircraft loaded with the physical template 101 may drop the physical template 101 within a region of interest 215 from a height. As the physical template 101 descends to the surface of the Earth 280, inflatable tubes serving as tie-bars may be inflated so that the physical template 101 unfolds into a rectangular grid that comes to lie within the region of interest 215 having the plurality 310 of sensors deployed in proximity to a plurality 210 of locations. The co-ordinates of the plurality 210 of locations may then be determined from the location 210-2 for the supervisory sensor, for example, sensor 310-2, using GPS or DGPS, as previously described. In accordance with examples of the present technology, the physical template dropped from the aircraft may be about 50 meters (m) by 50 m. In accordance with embodiments of the present invention, in order to deploy a large earth-based sensor network on the order of 10 km by 10 km, a plurality of the smaller physical templates may be "stitched" together, as next described.

With further reference to FIGS. 1A-4, in accordance with other examples of the present technology, the sensor-network-deployment system 401 may also further include a plurality of physical templates, of which physical template 101 is an example, having respective pluralities of sensors. At least two physical templates of the plurality may be stitched together to form a second larger physical template. The stitching operation may involve the utilization of a ground crew to arrange individual physical templates relative to one another into a larger seamless earth-based sensor network. Moreover, in accordance with examples of the present technology, sensors, of which sensor 310-1 is an example, in the earth-based sensor network 305 are readily deployable. Thus, the physical template 101 may be redeployable to another region of interest on the surface of the Earth 280, for example, by use of the vehicle, such that a large region of interest may be explored without stitching together a plurality of physical templates 101. Under these circumstances, the time used to dispose a plurality of templates in a large seamless earth-based sensor network is traded-off against the time used to make multiple measurements with a smaller earth-based sensor network corresponding to the size of one or a few physical templates. The above described mode of operation is expected to be especially useful in mineralogical prospecting operations, such as, petroleum exploration. Thus, examples of the present technology provide earth-based sensor networks that may be deployed in rugged, remote, and/or dynamically changing environments. The method of deploying the earth-based sensor network 305 utilizing the physical template 101 is next summarily described.

Figure 5:
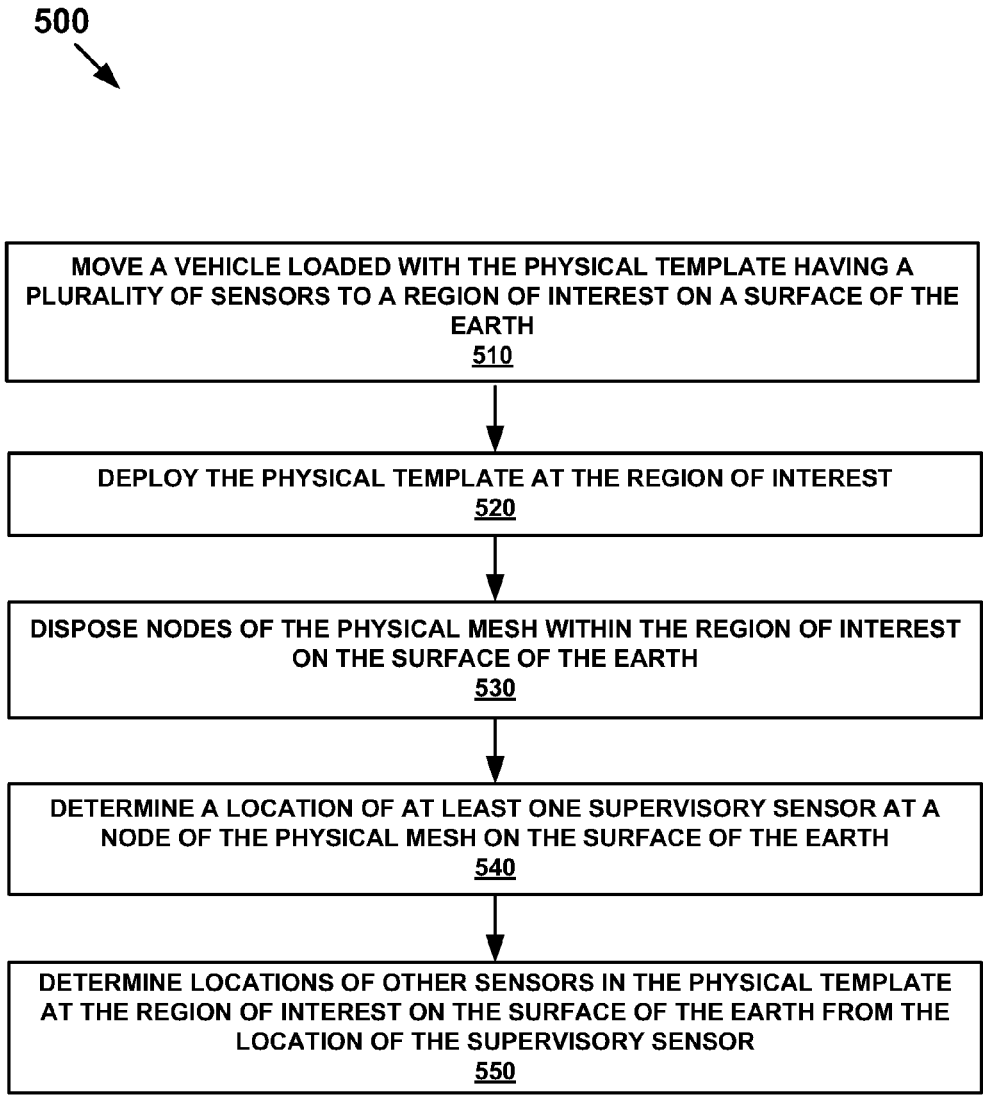
FIG. 5 is a flowchart of a method for deploying the earth-based sensor network utilizing the physical template of FIG. 1A, in accordance with examples of the present technology.

With reference now to FIG. 5, in accordance with yet other examples of the present technology, a flowchart 500 is shown of a method for deploying an earth-based sensor-network utilizing a physical template. The method for deploying the earth-based sensor network includes the following. At 510, a vehicle that is loaded with the physical template having a plurality of sensors is moved to a region of interest on a surface of the Earth. At 520, the physical template is deployed at the region of interest. At 530, nodes of the physical mesh are disposed within the region of interest on the surface of the Earth. At 540, a location of at least one supervisory sensor is determined at a node of the physical mesh on the surface of the Earth. At 550, locations of other sensors in the physical template are determined at the region of interest on the surface of the Earth from the location of the supervisory sensor.

According to the foregoing descriptions, examples of the present technology are suitable for rapid deployment of an earth-based sensor network including a large number of sensors with high accuracy. In addition, the foregoing descriptions of specific examples of the present technology have been presented for purposes of illustration and description. They are not intended to be exhaustive or to limit the technology to the precise forms disclosed, and many modifications and variations are possible in light of the above teaching. The examples described herein were chosen and described in order to best explain the principles of the technology and its practical application, to thereby enable others skilled in the art to best utilize the technology and various examples with various modifications as are suited to the particular use contemplated. It may be intended that the scope of the technology be defined by the claims appended hereto and their equivalents.

What is claimed is:

1. A physical template for deploying an earth-based sensor network, said physical template comprising:
    a physical mesh, configurable as a surface-covering structure comprising:
        a plurality of nodes, a node of said plurality to position a sensor for deployment of said sensor within a specified distance of a location on a surface of the Earth.

2. The physical template of claim 1, wherein said physical mesh comprises a sheet of material.

3. The physical template of claim 1, wherein said sheet of material comprises a flexible fabric.

4. The physical template of claim 1, further comprising:
    a sensor receptacle disposed at said node, said sensor receptacle to hold said sensor for deployment of said sensor within said specified distance of said location on said surface of the Earth; and
    wherein said physical mesh comprises a plurality of tie-bars, at least two tie-bars attached to said sensor receptacle, and configurable to position said sensor receptacle in proximity to said location for said sensor in said earth-based sensor network.

5. The physical template of claim 4, wherein said plurality of tie-bars comprises a framework of rigid members.

6. The physical template of claim 5, wherein a rigid member of said framework of rigid members comprises a rigid rod.

7. The physical template of claim 5, wherein said framework comprises an adjustable framework of rigid members; wherein rigid members are coupled within said framework with rotatable couplings.

8. The physical template of claim 4, wherein said plurality of tie-bars comprises a flexible framework of compliant members.

9. The physical template of claim 8, wherein a compliant member of said flexible framework of compliant members comprises an inflatable tube of material.

10. The physical template of claim 8, wherein a compliant member of said flexible framework of compliant members comprises a compliant member selected from the group consisting of a rope, a cable, a chain, a cord, a wire, and a metallic strip of shape-memory alloy.

11. The physical template of claim 1, wherein said physical mesh has a plurality of internodal regions between said nodes; and wherein a sensor-network appliance is disposed within an internodal region of said plurality of internodal regions.

12. The physical template of claim 1, wherein said tie-bars are disposed in a structure having a shape selected from the group consisting of rectangular grid, a triangular latticework, and a oblique latticework.

13. The physical template of claim 1, wherein said specified distance is less than about 10 centimeters.

14. A sensor-network-deployment system, comprising:
a physical template for deploying an earth-based sensor network, said physical template comprising:
a physical mesh, configurable as a surface-covering structure comprising:
a plurality of nodes, a node of said plurality to position a sensor for deployment of said sensor within a specified distance of a location on a surface of the Earth; and
a plurality of sensors, a sensor of said plurality of sensors disposed at said node.

15. The sensor-network-deployment system of claim 14, wherein said sensor is selected from the group consisting of an accelerometer, a geophone, a seismometer, a vibration sensor, a chemical sensor, a toxin sensor, a pollutant sensor, an explosive sensor, and a safety sensor.

16. The sensor-network-deployment system of claim 14, wherein at least one supervisory sensor further includes a sensor locator to determine the position of said supervisory sensor on said surface of the Earth; and wherein the positions of other sensors in said physical template are fixed relative to the position of said at least one supervisory sensor.

17. The sensor-network-deployment system of claim 14, further comprising:
a vehicle, said vehicle loaded with said physical template having said plurality of sensors;
wherein said vehicle is to deploy said physical template having said plurality of sensors within a region of interest on said surface of the Earth.

18. The sensor-network-deployment system of claim 14, further comprising:
a plurality of physical templates having respective pluralities of sensors;
wherein at least two physical templates of said plurality are stitched together to form a second larger physical template.

19. A method for deploying an earth-based sensor network utilizing a physical template, said method comprising:
moving a vehicle loaded with said physical template having a plurality of sensors to a region of interest on a surface of the Earth;
deploying said physical template at said region of interest;
disposing nodes of said physical mesh within said region of interest on said surface of the Earth;
determining a location of at least one supervisory sensor at a node of said physical mesh on said surface of the Earth; and
determining locations of other sensors in said physical template at said region of interest on said surface of the Earth from said location of said supervisory sensor.

* * * * *